(12) United States Patent
Kudas et al.

(10) Patent No.: US 9,089,970 B2
(45) Date of Patent: Jul. 28, 2015

(54) ROBOTIC APPARTUS AND SYSTEM FOR REMOVAL OF TURBINE BUCKET COVERS

(75) Inventors: Todd George Kudas, Elizabeth, PA (US); Brian David Albin, Chicago, IL (US)

(73) Assignee: General Electric Company, Schenectady, NY (US)

( * ) Notice: Subject to any disclaimer, the term of this patent is extended or adjusted under 35 U.S.C. 154(b) by 741 days.

(21) Appl. No.: 13/356,038

(22) Filed: Jan. 23, 2012

(65) Prior Publication Data
US 2013/0189903 A1    Jul. 25, 2013

(51) Int. Cl.
| B24B 51/00 | (2006.01) |
| B25J 9/16 | (2006.01) |
| B24B 19/14 | (2006.01) |
| B24B 27/00 | (2006.01) |
| B25J 11/00 | (2006.01) |

(52) U.S. Cl.
CPC ............... *B25J 9/1697* (2013.01); *B24B 19/14* (2013.01); *B24B 27/0038* (2013.01); *B25J 11/0055* (2013.01); *G05B 2219/45058* (2013.01)

(58) Field of Classification Search
USPC ........................................... 700/259; 901/46
See application file for complete search history.

(56) References Cited

U.S. PATENT DOCUMENTS

| 4,409,718 | A | * | 10/1983 | Pryor ........................ 29/407.04 |
| 4,864,777 | A | * | 9/1989 | McLaughlin et al. ............ 451/5 |
| 4,955,119 | A | | 9/1990 | Bonomi et al. |
| 5,165,829 | A | | 11/1992 | Ross et al. |
| 5,956,253 | A | * | 9/1999 | Gottschalk ................... 700/186 |
| 7,389,662 | B2 | * | 6/2008 | Roberts et al. .................... 72/53 |
| 7,966,856 | B1 | * | 6/2011 | Razi et al. ........................ 72/53 |
| 2006/0048364 | A1 | | 3/2006 | Zhang et al. |
| 2010/0314029 | A1 | * | 12/2010 | Lindgren et al. ................ 156/98 |
| 2011/0138873 | A1 | | 6/2011 | Razi et al. |

* cited by examiner

*Primary Examiner* — Darrin Dunn
*Assistant Examiner* — Geoffrey Wellman
(74) *Attorney, Agent, or Firm* — McNees Wallace & Nurick LLC

(57) ABSTRACT

A robotic apparatus and system for cutting turbine bucket covers on a turbine rotor are provided. The robotic apparatus includes a grinding device operable to drive a grinding wheel, a robotic arm coupled to the grinding device, a base member coupled to the robotic arm, a vision system for locating the fastener on the turbine bucket cover, and a control system. The base member is mounted independently of the turbine bucket cover. The control system is coupled to the vision system, the grinding device, and the robotic apparatus, and configured to control movement of the robotic apparatus and the grinding device based upon vision system data and spatial information related to the turbine bucket cover. The system includes at least a portion of a turbine rotor including a turbine bucket cover having at least one fastener thereon, and a robotic device for cutting the turbine bucket cover.

9 Claims, 7 Drawing Sheets

ROBOTIC APPARTUS AND SYSTEM FOR
REMOVAL OF TURBINE BUCKET COVERS

FIELD OF THE INVENTION

The present invention is directed to a robotic cutting machine. More specifically the invention is directed to a robotic cutting machine for cutting bucket covers for repair of turbine machines.

BACKGROUND OF THE INVENTION

In the construction of turbines (e.g., steam turbines), cover plates are employed for a variety of reasons and are generally secured to the tips of turbine buckets by peening fasteners formed on the buckets. To secure the bucket tips and cover plates to one another, solid fasteners on the bucket tips are peened into the bucket cover openings.

It is sometimes necessary to remove the cover plates in order to repair the buckets or to replace the cover plates. Currently, removal of the turbine bucket cover plates is a manual process that requires a repair technician to hold a pneumatic grinder with an abrasive disc and guide the grinder over the top of the cover. This process exposes the technician to dust from the abrasive wheel, noise at a close distance from the grinder, flying sparks and debris from the wheel, and fatigue from holding the tool. The depth of cut using the manual process may vary depending on the skill of the technician. If the cut is too deep the tip of the bucket vane can be damaged which could lead to an extensive repair or bucket replacement.

A method for removing bucket covers that does not require the use of manual cutting tools is accomplished by placing the turbine rotor into a rotor turning device or lathe. A tool bit is used to cut the covers up to the tenons of the buckets as the rotor is rotating at a constant speed. One drawback of this method is that a rotor turning device, tool compound, and cutting tools are needed to remove the covers. With the robotic cutting system a turning device or lathe is not required.

What is needed is a system that allows for the operator to remain at a distance from the cutting operation and reduces the possibility of inhalation of grinding dust, debris in the eyes, and operator fatigue, and to precisely control the cuts made on each bucket cover. Also needed is a programmable robotic method and apparatus for cutting bucket covers which may virtually eliminate the possibility of cutting into a vane tip, and so that a steel grinding wheel may be used repeatedly without changing.

SUMMARY OF THE INVENTION

In one embodiment a robotic apparatus for repairing a turbine bucket cover of a steam turbine machine includes a grinding device operable to drive a grinding wheel. A robotic arm is coupled to the grinding device. A base member is coupled to the robotic arm. The base member is mounted independently of the turbine bucket cover. A vision system is provided for locating the fastener on the turbine bucket cover. A control system is coupled to the vision system, the grinding device and the robotic apparatus, the control system controls movement of the robotic apparatus and the grinding device based upon vision system data and spatial information related to the turbine bucket cover.

In another embodiment a method is disclosed for cutting turbine bucket covers on a turbine rotor. The method includes marking a cut path on a surface of the turbine bucket cover, the cut path comprising a plurality of finite lines defined by a pair of end points; directing a laser at each end point of each line of the cut path; storing a set of position coordinates of each end point for every line of the cut path; generating the cut path based on the respective end points; and following the cut path on the turbine bucket cover with a grinding machine attached to a robotic device; and cutting the turbine bucket cover according to the cut path.

In yet another embodiment a system is disclosed for cutting turbine bucket covers on a turbine rotor, the system includes a turbine rotor with a turbine bucket cover having fasteners thereon, and a robotic device for cutting the turbine bucket cover. The robotic device includes a grinding device operable to rotatably drive a grinding wheel. A robotic arm is coupled to the grinding device. A base member is coupled to the robotic arm. The base member is in contact with the surface independently of the portion of the turbine rotor. A vision system is provided for locating the fastener on the turbine bucket cover. A control system is in communication with the vision system, the grinding device and the robotic apparatus. The control system controls movement of the robotic apparatus and the grinding device based upon vision system data and spatial information about the turbine bucket cover.

An advantage of the robotic cutting system is that it allows for the operator to remain at a much greater distance from the cutting operation which reduces the possibility of inhalation of grinding dust, debris in the eyes, and drastically reduces operator fatigue because they do not have to hold any tool to perform the operation. The depth of cut is precisely controlled on each cover and if programmed correctly virtually eliminates the possibility of cutting into a vane tip. The steel grinding wheel can be used repeatedly without changing like has to be done when using abrasive wheels.

Another advantage in using the robotic cutting system is the robotic cutting system provides extremely accurate cuts in following the programmed cut path. The system will follow the programmed cut path exactly the same on each bucket. The depth of cut is precisely controlled by use of the touch probe thus eliminates the mistakes often seen by cutting covers using manual processes.

Also, by using the robotic cutting system the number of operators may be reduced while at the same time the rate of cover removal is not compromised. This enables the same volume of repairs to be completed at a lower cost.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
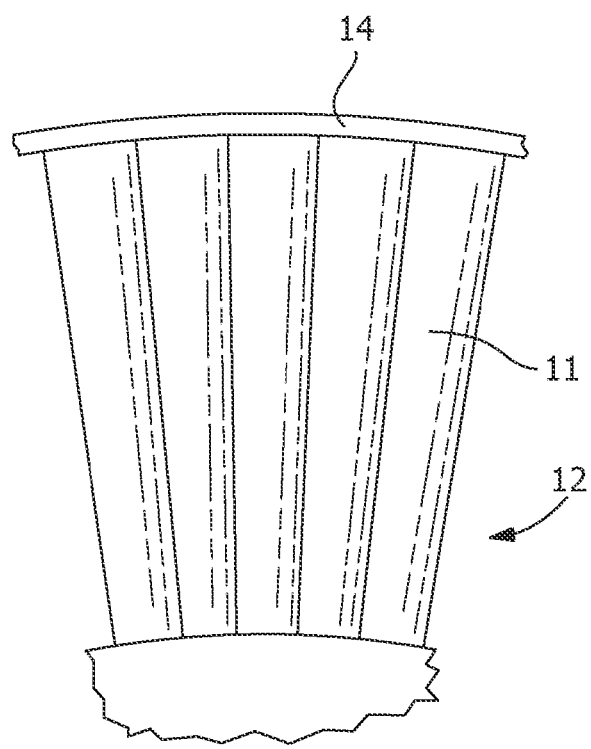
FIGS. 1-3 show fragmentary views of portions of a turbine for a turbine bucket cover repair process.
Figure 2:
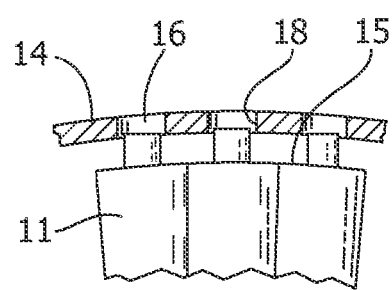
Figure 3:
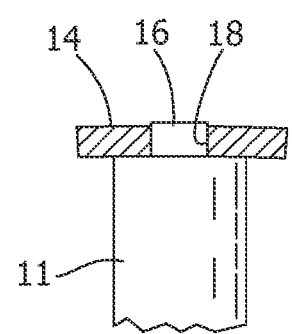

FIGS. 1-3 illustrate portions of the bucket cover plate removal process of a section of a turbine machine. FIG. 1 shows a plurality of buckets 11 forming part of a rotating component of a turbine, e.g., a steam turbine, 12. A cover plate 14 is shown secured to outer tips 15 of buckets 11, where cover plate 14 extends in a circumferential direction about buckets 11. FIGS. 2-3 show the tips 15 of buckets 11 having one or more tenons 16 projecting radially outward therefrom. Each cover plate 14 may include an arcuate circumferentially extending segment for spanning a plurality of buckets 11 (e.g., four or five buckets). Each cover plate 14 may include a plurality of openings 18 for receiving tenons 16. Tenons 16 may be received in openings 18 and peened to form a substantially flush cover design, as shown in FIG. 3.

The turbine bucket cover removal system incorporates a robotic arm mounted to a structural base, robotic control system, laser distance finder, touch probe, vision system, and grinder end effector. The arm supports all of the weight of the grinder and enables the movement of the grinder. The robotic control system is used to program and control the movement of the arm. The touch probe, laser distance finder, and vision system are used to program the robotic motion. The grinder is the primary tool used to grind or cut the covers off of the turbine buckets. The grinder incorporates a steel cutting wheel with diamond coated serrated teeth, a custom made adapter bracket to mount to the robotic arm, and a tool changer that provides power to the tool. The operator programs the cut path that the grinder will follow on the bucket cover using the laser, touch probe, and vision system.

After the cut path is programmed, the robotic controller guides the arm and end effector along the cut path on the first bucket. Upon finishing cutting the cover on the first bucket, the robot indexes itself to the next bucket and repeats the cut path. The robot will continue to index to the next bucket until it the robot arm is fully extended. The robot motion is programmed each time a new row of bucket covers is to be removed.

FIGS. 1-3 illustrate portions of the bucket cover plate removal process of a section of a turbine machine. FIG. 1 shows a plurality of buckets 11 forming part of a rotating component of a turbine, e.g., a steam turbine, 12. A cover plate 14 is shown secured to the outer tips of buckets 11, where cover plate 14 extends in a circumferential direction about buckets 11. FIGS. 2-3 show the tips of buckets 11 having one or more tenons 16 projecting radially outward therefrom. Each cover plate 14 may include an arcuate circumferentially extending segment for spanning a plurality of buckets 11 (e.g., four or five buckets). Each cover plate 14 may include a plurality of openings 18 for receiving tenons 16. Tenons 16 may be received in openings 18 and peened to form a substantially flush cover design, as shown in FIG. 3.

Referring to FIG. 2, an exemplary robot 22 for cutting a cover plate 14 of a turbine bucket 11 is shown. Robot 22 may include a grinder 24 grinding wheel 26. Grinder 24 may include any conventional milling head 26 capable of machining a tenon at an end of a vane or bucket. In one embodiment, grinder 24 may be, e.g., a right angle electric grinder manufactured by Metabo angle grinder, Model No. W23-230 or W25-230, manufactured by Metabo Corporation of West Chester, Pa. Grinding wheel 26 may be formed of a metal, e.g., steel with a diamond grinding disk, which is capable of cutting steel or similar material used for turbine bucket cover plates 14.

An exemplary embodiment of a robotic apparatus 28 may include a robotic arm 30 coupled to grinder 24. Robotic apparatus 28 and grinder 24 may be coupled in any conventional manner, e.g., via joints, welds, clamps, etc. Robotic arm 30 may include a plurality of segments 32 and joints 34 allowing robotic arm 30 to assist in machining tenons at different locations on a machine. Robotic apparatus 28 is also shown including a base member 36 coupled to robotic arm 30. It is understood that robotic apparatus 28 including robotic arm 30 and base member 36 may include electrical and electro-mechanical components capable of actuating movement of robotic arm 30 and/or grinder 24. These electrical and electro-mechanical components are known in the art of robotics, and are not described herein for clarity.

A vision system 38 is disclosed for locating a cover 16 or other reference point on a machine element, e.g., a tenon (FIG. 1). Vision system 38 may include a conventional two-dimensional or three-dimensional optical recognition system which may detect a location of a fastener on the machine element. Vision system 38 may be capable of high speed image acquisition and processing, and may locate a shape of a cover 16 by optically recognizing the original fastener design (e.g., the original shape of a tenon as indicated by spatial information 140, described with reference to FIG. 5).

Figure 4:
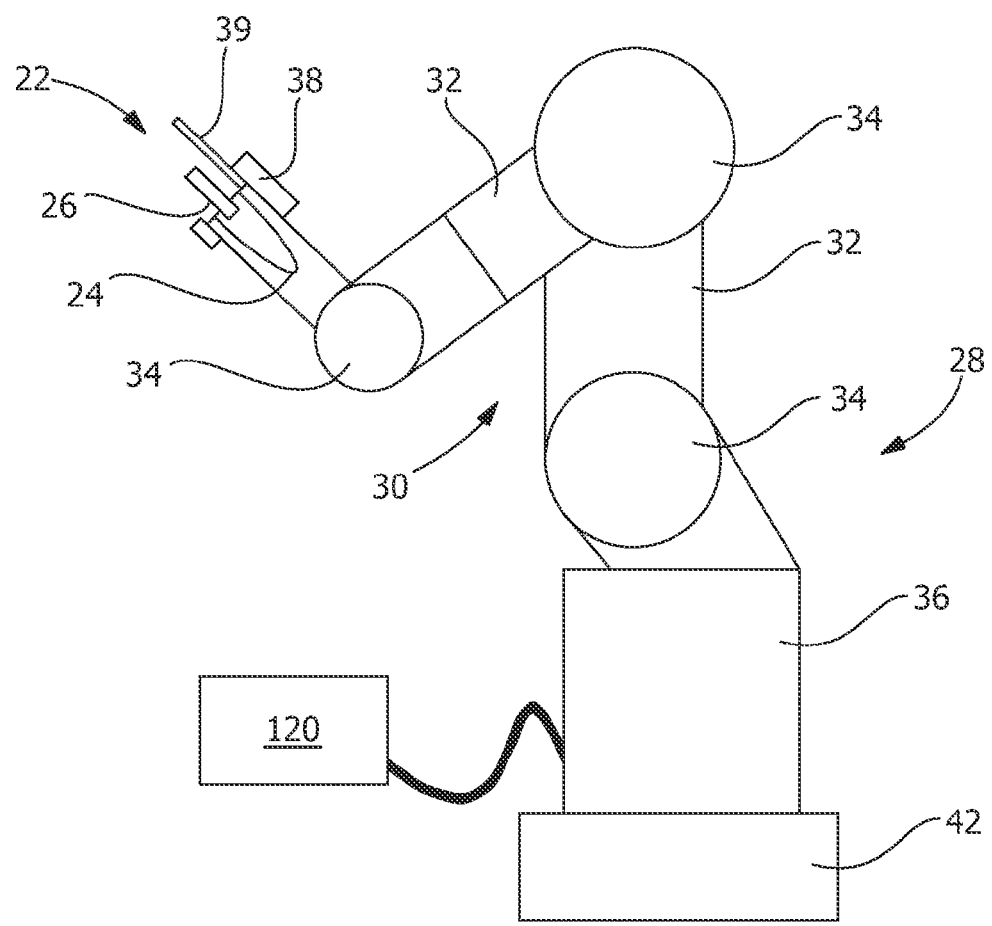
FIG. 4 shows a side schematic view of an apparatus for cutting turbine bucket covers according to an exemplary embodiment.

Robot 22 may also include a computer system 120 coupled to vision system 38, grinder 24, and robotic apparatus 28. Computer system 120 may be configured to control movement of robotic apparatus 28 and grinder 24 via a robotic control system 40 (FIG. 5), based upon data received from vision system 38 and spatial information about the fastener and the machine element. Also shown in FIG. 4 is a shock absorbing member 42 coupled to base member 36. Shock absorbing member 42 may include one or more types of material capable of absorbing forces caused by vibrations within robotic apparatus 28. For example, shock absorbing member 42 may include a plurality of (e.g., three) distinct rubber vibration dampening pads, which may isolate the vibration of robotic apparatus 28 from a surface (not shown). In any case, shock absorbing member 42 may be configured to reduce vibration in robotic apparatus 28 and grinder 24, and improve the performance of robot 22.

Figure 5:
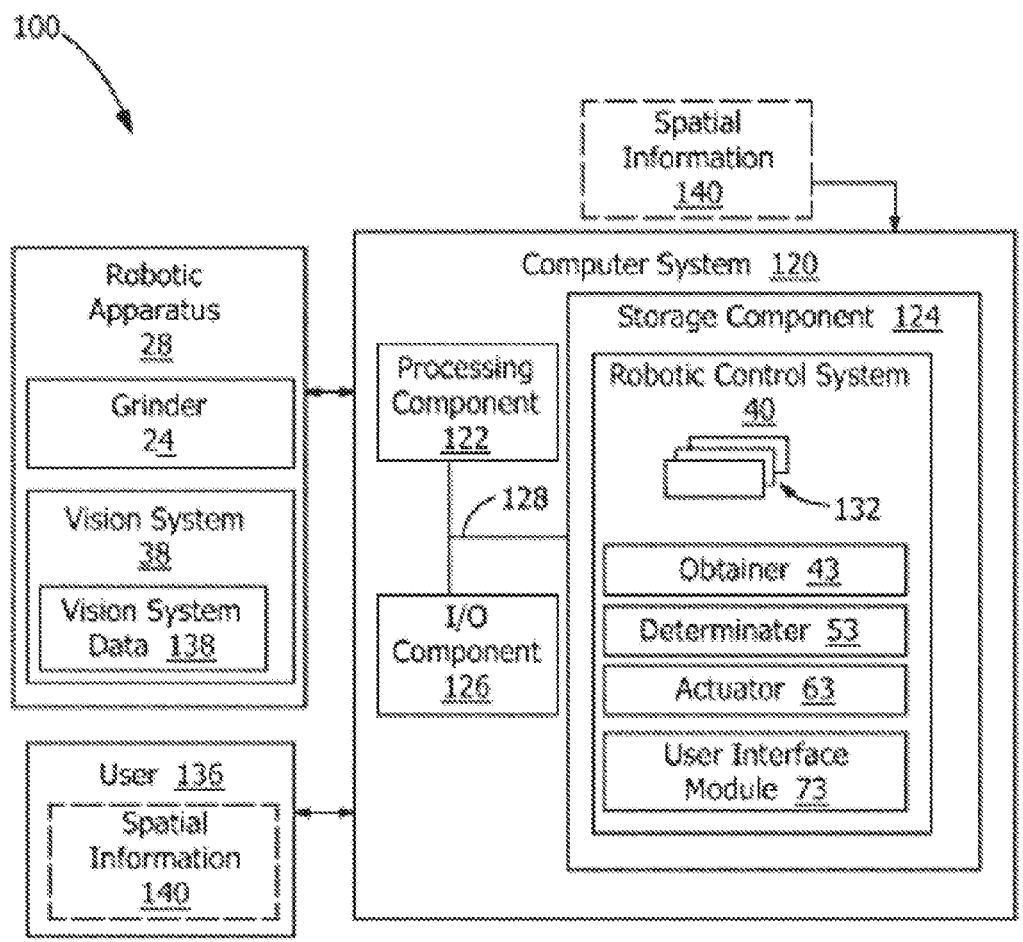
FIG. 5 shows an environment of a robotic apparatus for machining a tenon according to an exemplary embodiment.

Referring next to FIG. 5, an illustrative environment 100 for robotic machining tenons is disclosed. To this extent, environment 100 includes computer system 120, which can perform processes described herein in order to machine tenons using apparatus 22. In particular, computer system 120 is shown including a robotic control system 40, which makes computer system 120 operable to provide instructions to apparatus 22 for machining tenons by performing a process described herein.

Computer system 120 is shown in communication with apparatus 22, which may include grinder 24 and vision system 38. Further, computer system 120 is shown in communication with a user 136. A user 136 may be, for example, a programmer or operator. Interactions between these components and computer system 120 will be discussed in subsequent portions of this application. Computer system 120 is shown including a processing component 122 (e.g., one or more processors), a storage component 124 (e.g., a storage hierarchy), an input/output (I/O) component 126 (e.g., one or more I/O interfaces and/or devices), and a communications pathway 128. In one embodiment, processing component 122 executes program code, such as robotic control system 40, which is at least partially embodied in storage component 124. While executing program code, processing component 122 can process data, which can result in reading and/or writing the data to/from storage component 124 and/or I/O component 126 for further processing. Pathway 128 provides a communications link between each of the components in computer system 120. I/O component 126 can comprise one or more human I/O devices or storage devices, which enable user 136 to interact with computer system 120 and/or one or more communications devices to enable user 136 to communicate with computer system 120 using any type of communications link. To this extent, robotic control system 40 can manage a set of interfaces (e.g., graphical user interface(s), application program interface, and/or the like) that enable human and/or system interaction with robotic control system 40.

Computer system 120 can include one or more general purpose computing articles of manufacture, e.g., computing devices, capable of executing program code installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, robotic control system 40 can be embodied as any combination of system software and/or application software. In any event, the technical effect of computer system 120 is to provide processing instructions to apparatus 22 in order to machine tenons.

Further, robotic control system 40 can be implemented using a set of modules 132. In this case, a module 132 can enable computer system 120 to perform a set of tasks used by robotic control system 40, and can be separately developed and/or implemented apart from other portions of robotic control system 40. Robotic control system 40 may include modules 132 which comprise a specific use machine/hardware and/or software. Regardless, it is understood that two or more modules, and/or systems may share some/all of their respective hardware and/or software. Further, it is understood that some of the functionality discussed herein may not be implemented or additional functionality may be included as part of computer system 120.

When computer system 120 comprises multiple computing devices, each computing device may have only a portion of robotic control system 40 embodied thereon, e.g., one or more modules 132. However, it is understood that computer system 120 and robotic control system 40 are only representative of various possible equivalent computer systems that may perform a process described herein. To this extent, in other embodiments, the functionality provided by computer system 120 and robotic control system 40 can be at least partially implemented by one or more computing devices that include any combination of general and/or specific purpose hardware with or without program code. In each embodiment, the hardware and program code, if included, can be created using standard engineering and programming techniques, respectively.

The computing devices can communicate over any type of communications link. Further, while performing a process described herein, computer system 120 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, robotic control system 40 enables computer system 120 to provide processing instructions to apparatus 22 for machining tenons. Robotic control system 40 may include logic, which may include the following functions: an obtainer 43, a determinator 53, an actuator 63 and a user interface module 73. In one embodiment, robotic control system 40 may include logic to perform the above-stated functions. Structurally, the logic may take any of a variety of forms such as a field programmable gate array (FPGA), a microprocessor, a digital signal processor, an application specific integrated circuit (ASIC) or any other specific use machine structure capable of carrying out the functions described herein. Logic may take any of a variety of forms, such as software and/or hardware. However, for illustrative purposes, robotic control system 40 and logic included therein will be described herein as a specific use machine. As will be understood from the description, while logic is illustrated as including each of the above-stated functions, not all of the functions are necessary according to the teachings of the invention as recited in the appended claims.

Figure 6:
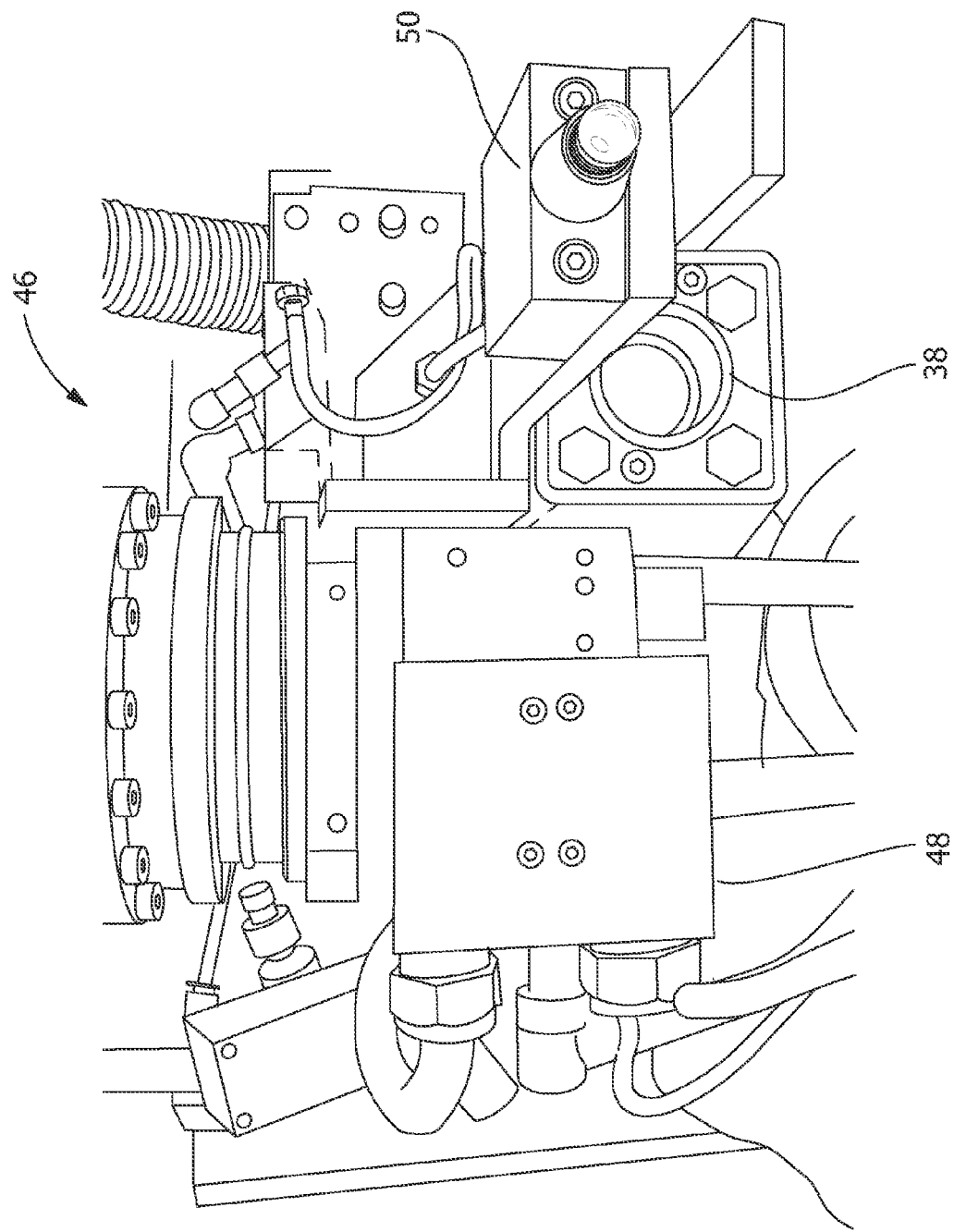
FIG. 6 shows an environment of a robotic apparatus for cutting bucket covers of a turbine rotor according to an exemplary embodiment.
Figure 7:
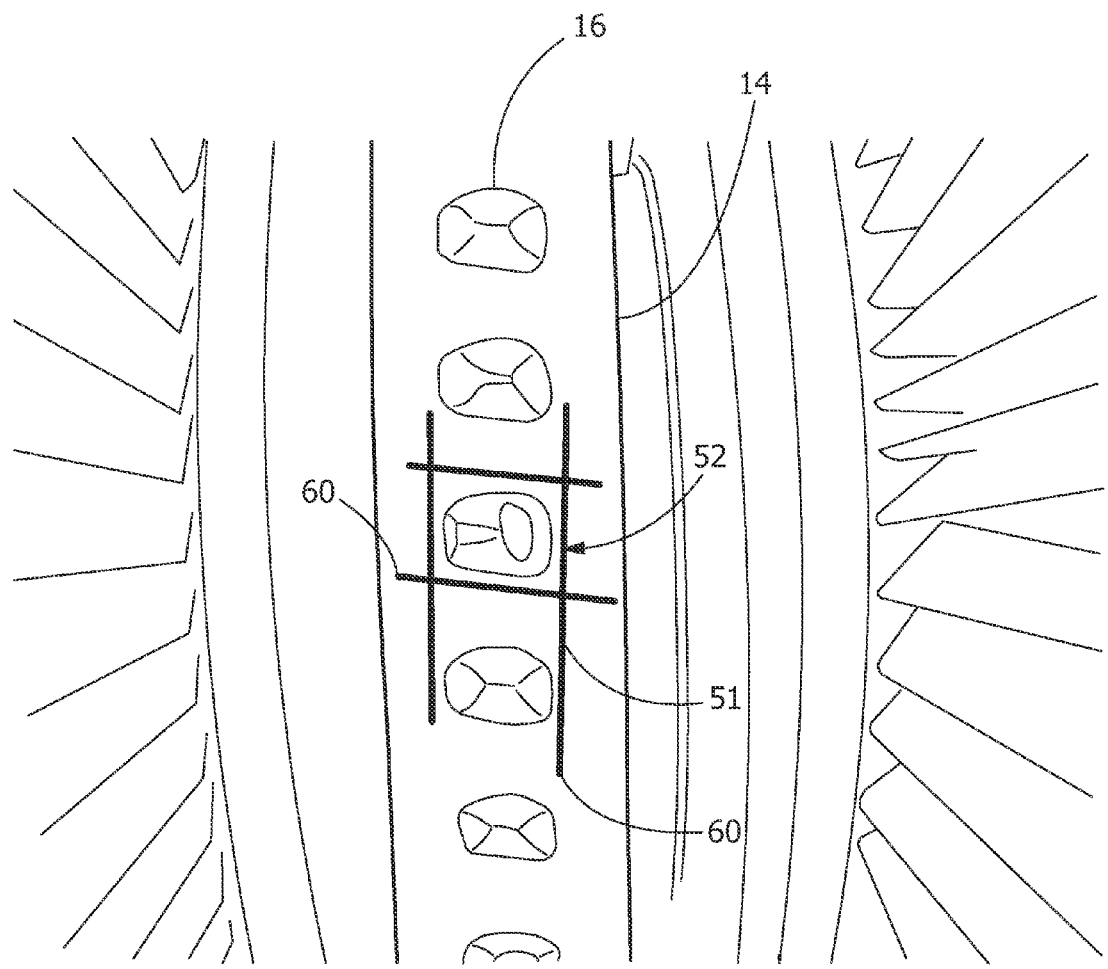
FIG. 7 shows an exemplary layout for a cut path on a turbine bucket cover.

Referring next to FIG. 6, a tool changer assembly 46 may include electric, pneumatic and control connections 48, a camera or vision system 38 and a touch probe 50. The grinder or cutter 24 follows a cut path 52 (FIG. 7) programmed into controller 40 based on operator input, i.e., training. The operator also establishes the camera programming during the setup to recognize a tenon 16. The cutter then follows the cut path 52, moves to next tenon, and camera 38 orients the cut path based on a programmed image. After tenon 16 is located robotic arm 30 follows the cut path 52 programmed into the recipe based on the 0, 0 point.

Figure 8:
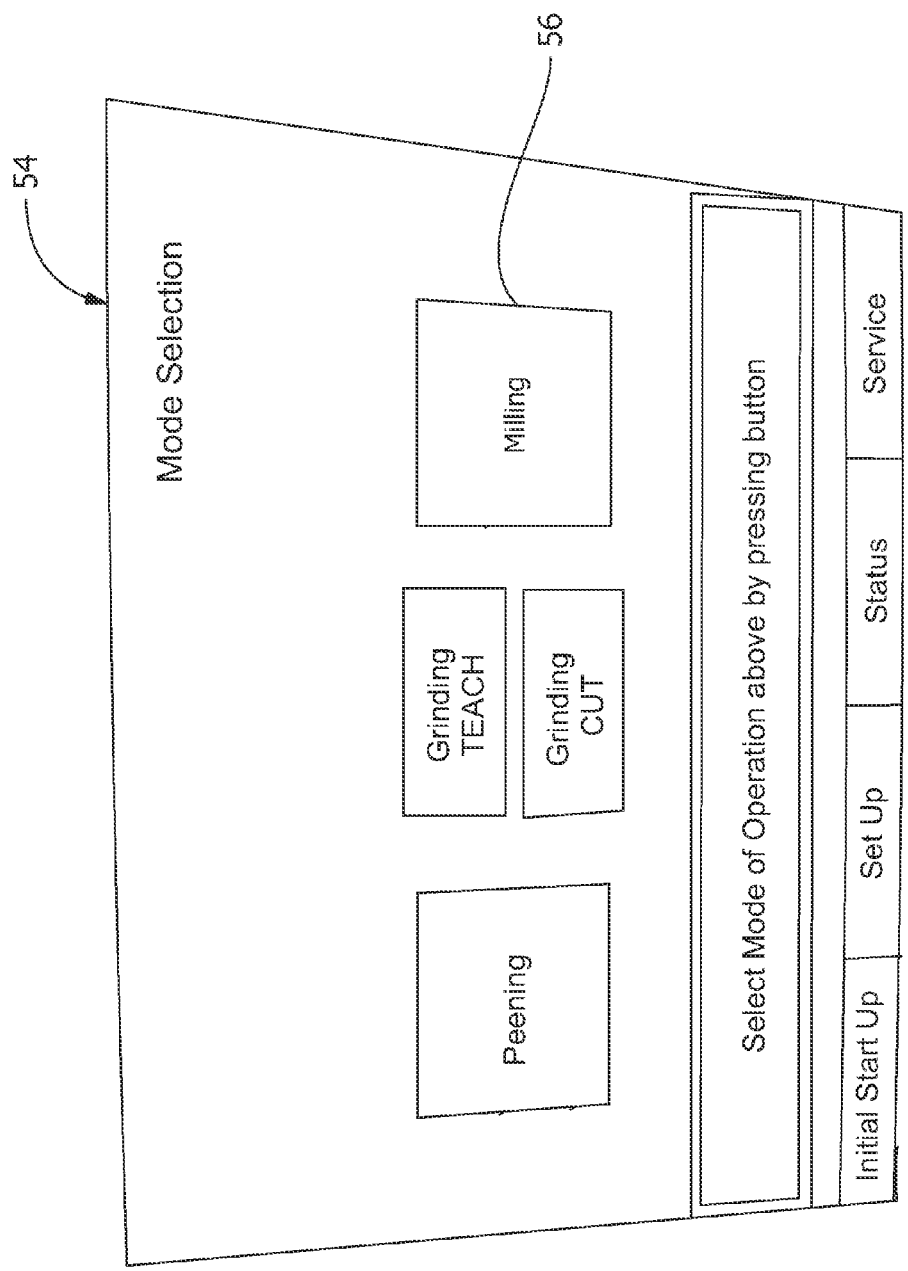
FIG. 8 shows an exemplary Human-Machine Interface (HMI) screen.

Referring to FIG. 8, an HMI 54 may be used to select a cutting program from a menu of various functions. Grinding programs may be separated into (a) TEACH & (b) CUT programs. Setup and alignment programs are operated from a control pendant or controller 40 of the robotic apparatus 28. HMI 54 may include selection elements or buttons 56 for selecting a mode of operation of the robotic apparatus 28, e.g., grinding TEACH or grinding CUT modes or programs. Other programmed operator selections may include, e.g., grinding recipe, number of cuts and cover thickness associated with the respective cover.

Figure 9:
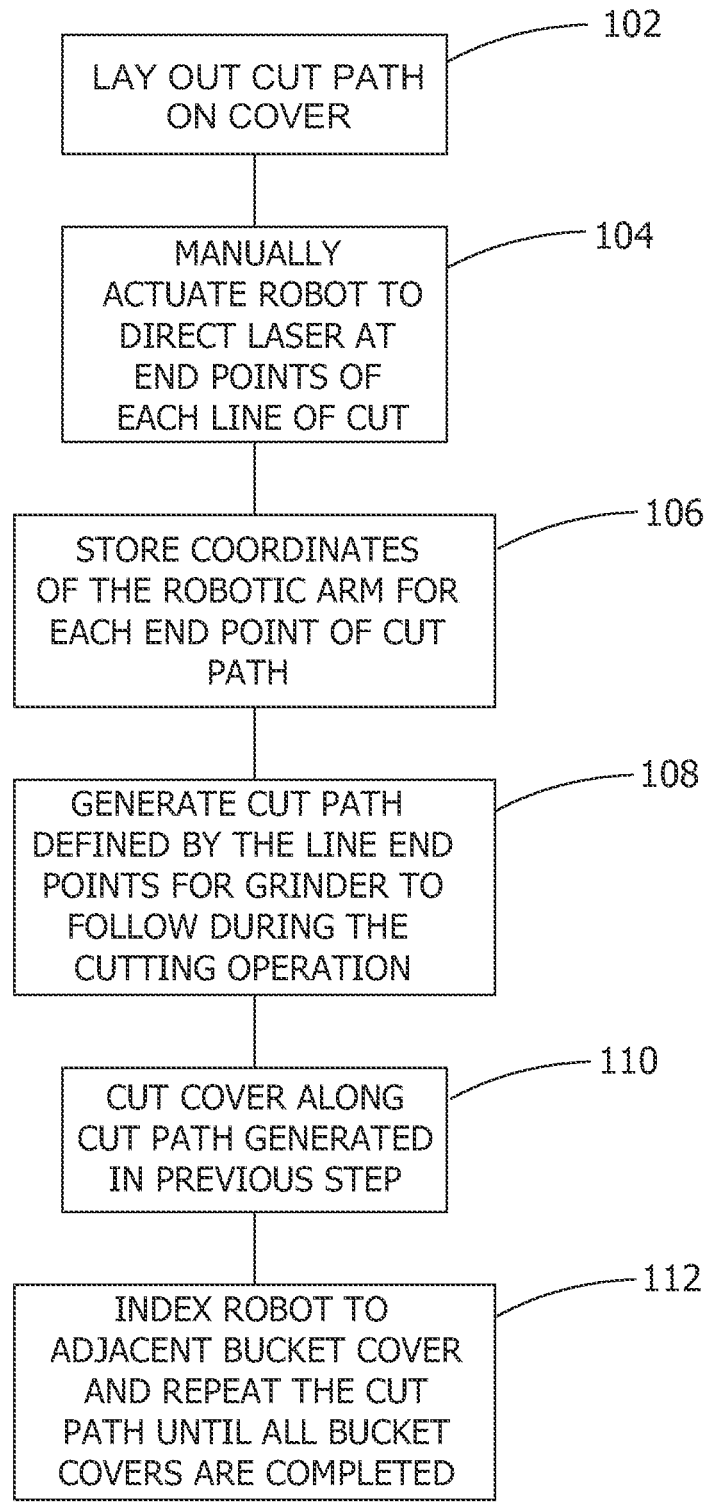
FIG. 9 shows a flow diagram of an exemplary method for cutting bucket covers of a turbine rotor.

A method for robotically performing cutting of turbine bucket covers is shown in FIG. 9. The method begins at step 102 by laying out a desired cut path on a cover 14. Black lines 51 or similar markings that are recognizable by a camera or vision detection system 38 are drawn on cover 14 to layout a desired cut path 52. After lines 51 are drawn on cover 14, at step 104 robotic apparatus 28 is manually actuated so that the laser is directed at an end point 60 of each line 51 of cut path 52. Laser 39 (FIG. 4) is directed at the selected end point and an operator triggers laser 39 (FIG. 4) to store the coordinates of the robotic arm 30 associated with the selected end point(s) 60. The robotic arm coordinates for the respective end points 60 are then stored in the robot controller storage component or memory 124 at step 106. At step 108, the robotic apparatus 28 generates a line extending between the stored end points 60 for each of the lines 51 which grinder 24 will follow during the cutting operation. At step 110, robotic arm 30 is actuated by controller 40 to cut cover 14 along the cut path 52 generated at step 108. At step 112, the robotic apparatus 28 is indexed to an adjacent bucket cover 14 and robotic apparatus repeats cutting covers 16 along the stored cut path until all bucket cover cuts are completed.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A robotic apparatus for repairing a turbine bucket cover of a turbine machine, the robotic apparatus comprising:
    a grinding device operable to drive a grinding wheel;
    a robotic arm coupled to the grinding device;
    a base member coupled to the robotic arm opposite the grinding device, the base member mounted to a surface independently of the turbine bucket cover;
    a vision system for locating a fastener on the turbine bucket cover and generating vision system data indicating the location of the fastener on the turbine bucket cover; and
    a control system coupled to the vision system, the grinding device and the robotic apparatus, the control system configured to control movement of the robotic apparatus and the grinding device based upon vision system data and spatial information related to the turbine bucket cover;
    wherein the turbine bucket cover is coupled to at least one turbine blade by the fastener, and the control system is configured to program a cut path based upon the vision system data and guide the grinding device along the cut path to cut away turbine bucket cover material surrounding the fastener.

2. The apparatus of claim 1, wherein the apparatus is arranged and disposed to cut away the turbine bucket cover material surrounding the fastener of at least one of a plurality of the turbine bucket covers comprising a portion of a turbine assembly.

3. The apparatus of claim 1, wherein the robotic apparatus is programmed to actuate the grinding device in a pre-defined pattern in response to a command from the control system.

4. The apparatus of claim 1, wherein the grinding device includes at least one of an electric connection, a pneumatic connection and a control connection.

5. The apparatus of claim 1, further comprising a touch probe, wherein the control system is configured to set a cut depth based upon touch probe data received from the touch probe, and wherein the vision system data includes data about a location of a reference point of the fastener.

6. The apparatus of claim 1, further comprising a shock absorbing member coupled to the base member.

7. A system for cutting turbine bucket covers on a turbine rotor, the system comprising:
    at least a portion of a turbine rotor including a turbine bucket cover having at least one fastener thereon; and a robotic device for cutting the turbine bucket cover, the robotic device comprising:
        a grinding device operable to rotatingly drive a grinding wheel;
        a robotic arm coupled to the grinding device;
        a base member coupled to the robotic arm opposite the grinding device, the base member in contact with a surface independently of the portion of the turbine rotor;
        a vision system for locating the at least one fastener on the turbine bucket cover and generating vision system data indicating the location of the fastener on the turbine bucket cover; and
    a control system in communication with the vision system, the grinding device and the robotic apparatus, the control system configured to control movement of the robotic apparatus and the grinding device based upon vision system data and spatial information about the turbine bucket cover;
    wherein the turbine bucket cover is coupled to at least one turbine blade by the fastener, and the control system is configured to program a cut path based upon the vision system data and guide the grinding device along the cut path to cut away turbine bucket cover material surrounding the fastener.

8. The system of claim 7, wherein the robotic apparatus is programmed to actuate the grinding device in a pre-defined pattern in response to a command from the control system.

9. The system of claim 7, wherein the grinding device includes at least one of an electric connection, a pneumatic connection and a control connection for operating the grinding device.

* * * * *